3,504,038
OZONIZATION OF VEGETABLE OILS IN AN IMPROVED AQUEOUS MEDIUM

Robert E. Beal, Elmwood, Ill., assignor to the United States of America as represented by the Secretary of Agriculture
No Drawing. Filed June 24, 1966, Ser. No. 560,961
Int. Cl. C07c 49/50
U.S. Cl. 260—601                3 Claims

ABSTRACT OF THE DISCLOSURE

Formation of a tenacious creamlike phase that limits the ozonizaton of a polyunsaturated vegetable oil in an aqueous medium and wastes costly ozone is prevented by the prior addition of a $C_8$–$C_9$ aldehyde or dimethyl acetal thereof and whereby aldehydic products are obtained

---

A nonexclusive, irrevocable, royalty-free license in the invention herein described, throughout the world for all purposes of the United States Government, with the power to grant sublicenses for such purposes, is hereby granted to the Government of the United States of America.

This invention relates to an improved aqueous medium for converting unsaturated vegetable oils to aldehydic products by ozonization of the unsaturated fatty acids followed by reduction of the ozonides.

More particularly this invention involves the addition of a straight chain saturated aldehyde prior to the high speed mechanical emulsification of the vegetable oil-in-water, thereby permitting the full advantages of ozonization in an aqueous medium by avoiding the gradual buildup of an extremely tenacious, viscous, creamlike, substantially nonozonizable oil-in-water phase that cannot be redispersed simply by mechanical means and that remains distinct from the properly reactive more aqueous emulsion.

The formation of valuable aldehydic products by the reduction of ozonides from unsaturated vegetable oils or monoesters thereof is well known. To improve the dissipation of the exothermic heat of reaction the reactions are conventionally conducted in an organic solvent solution such as a lower aliphatic alcohol, a liquid hydrocarbon such as hexane, or in a chlorinated solvent such as methylene chloride thereby reducing the formation of unwanted polymer and other byproducts that result from local overheating.

However, the organic solvents must be recovered from the aldehyde products and must be purified so that they can be reused. In addition, since many of the more efficient organic solvents have fairly high vapor pressures and are flammable, they are especially hazardous if not carefully removed from a system wherein oxygen-containing effluent that can also contain vapors of the solvent must be recycled to a high voltage ozone generator.

Otsuki et al., U.S. Patent No. 2,862,940, and Maggiolo, U.S. Patent No. 2,865,937, both teach the use of water as a vehicle for the ozonolysis and reduction of unsaturated fatty acids and esters thereof, the water-insoluble acids being mechanically dispersed or emulsified without the addition of emulsifiers. However, I found the patented technique to be rather unsatisfactory when applied to the ozonization and reduction of the vegetable oils, e.g., linseed oil or soybean oil in place of the acids or esters, because of the early formation of an extremely thick, creamy water-in-oil emulsion layer that was distinct from the oil-in-water principal phase and could not be redispersed no matter how much more vigorous the agitation. The water-in-oil emulsion phase reacted with ozone at a sharply reduced and negligible rate, thereby causing the effluent oxygen to retain an abnormally large and dangerous amount of unreacted ozone, and despite considerable prolongation of the ozonization time and carefully executed reduction, the yields of desired aldehydic products were considerably diminished due to localized heat effects and resulting byproduct formation.

The primary object of the present invention is the provision of a means whereby water can be used as the vehicle for the quantitative ozonization and reduction of unsaturated vegetable oils. Another object is the provision of an improved nonhazardous process for obtaining essentially theoretical yields of relatively short chain aldehydes from vegetable oils without requiring a prior preparation of the constituent acids. Other and related objects will be apparent to those skilled in the art.

In accordance with the above objects of the invention, I have now discovered that unimpeded and essentially quantitative ozonizations and ozonolyses of unsaturated vegetable oils are obtained in a mechanically dispersed or mechanically emulsified aqueous medium or vehicle with no formation of a separate extremely viscous water-in-oil phase if the aqueous medium also comprises an aliphatic aldehyde such as capryl aldehyde, i.e., n-octyl aldehyde or pelargonic aldehyde, i.e., n-nonyl aldehyde, or a corresponding acetal such as the dimethyl acetal in an amount approximately equal to the weight of the oil to be ozonized. In a thusly fortified aqueous medium the high speed mixing produces an apparently uniform oil-in-water dispersion, and the ozonization of the oil proceeds rapidly with no hindrance by a concurrent formation of an oil-in-water emulsion that will not readily absorb or mix with gases and whose viscosity also reduces the speed and effectiveness of the mechanical agitator and the rapid dissipation of exothermic heat of reaction.

EXAMPLE 1

Into a 15-gallon glass-lined autoclave equipped with an anchor type agitator, and an external jacket, were poured 650 grams of refined soybean oil, 650 grams of pelargonaldehyde, and 1750 grams of distilled water, these proportions of water and soybean oil representing 2.7 parts by weight of water per part of the oil. A centrifugal pump was used to circulate the liquid phase by pumping it from the bottom outlet of the autoclave and discharging it through a section of pipe about 15 feet in overall length, into the top of the autoclave through the top cover. While the liquid phase was continuously agitated and circulated through the pump and external pipe line, a mixture of about 2% ozone and 98% oxygen was introduced continuously at a rate of 2.4 standard cubic feet per minute into the pipe line at the discharge side of the pump. Reaction between the unsaturated centers in the oil and the ozone in the gas occurred while the liquid and gas phases were flowing through the pipe in turbulent flow. The temperature of the liquid phase was 75° to 100° F. during the reaction. Unreacted gas was continuously vented from the glass lined autoclave so that the pressure within the autoclave was essentially equal to atmospheric pressure. The vent gas was periodically tested for ozone concentration by bubbling 0.1 cubic feet of the gas through 400 milliliters of an aqueous potassium iodide solution and determining the amount of iodine liberated. No ozone was found in the exit gas until substantial completion of the reaction. When ozone was found in the exit gas the reaction was discontinued, and the cooled liquid phase emulsion was catalytically reduced with hydrogen at 100 p.s.i. in the presence of a palladium catalyst at about 40° C., until the oil phase was free of peroxides. For analytical purposes a sample of the resulting aldehyde oil layer was converted to the methyl esters with methanol, dimethoxypropane, and 1% sulfuric acid, and the esters were analyzed by gas liquid chromatography. They were found to contain no unsaturated fatty acid methyl esters and only the amount of methyl stearate present in the original soybean oil showing that complete reaction of ozone with the olefinic bonds had occurred.

By contrast, in the absence of the aldehyde additive of my invention, when 6 pounds of soybean oil and 12 pounds of distilled water were treated with ozone in the same equipment and otherwise using the same procedure, when the ozonization was only 41 percent complete, as determined by residual unsaturation of a sample, about 2 percent of the ozone introduced to the reactor was not absorbed. When ozonization was 84 percent complete, 36 percent of the ozone was not absorbed and the oil phase was a very viscous, white emulsion which separated from the bulk of the water phase and would not mix with it even though the stirrer provided good agitation.

EXAMPLE 2

The same equipment described in Example 1 was used to treat with ozone a mixture consisting of 1 quart of soybean oil; 1 quart of a 3:1 mixture of pelargonaldehyde dimethyl acetal; and a caproaldehyde dimethyl acetal, and 2 quarts of distilled water, these proportions of water and soybean oil representing 2.2 parts by weight of water per part of the oil. Ozonization was conducted with 2% ozone in oxygen as in Example 1 excepting that the temperature of the reaction mixture increased from 80° to 114° F. during the reaction. When a small concentration of ozone (5% of the inlet concentration) was found in the vent gas, the reaction was discontinued. After reduction of the ozonized oil a sample of the aldehyde was converted to methyl ester-acetals and analyzed by GLC. No unsaturated esters were found showing that complete ozonization had been obtained.

The above examples are not intended to restrict the scope of the invention and other straight chain aldehydes or aldehyde acetals should be equally effective to those cited for controlling the character of the emulsion of ozonized vegetable oil and water so that it remains homogenous, fluid, and able to readily and completely absorb ozone until complete reaction of unsaturated double bonds is obtained.

I claim:

1. In a process for reacting ozone with soybean oil that is mechanically dispersed in 2.2 to 2.7 parts by weight of water per part of the solbean oil, the improvement comprising the step of also dispersing therein prior to the admission of ozone thereto about 1 part based on the weight of said oil in an aldehydic compound selected from the group consisting of n-capryl aldehyde, n-nonyl aldehyde, pelargonaldehyde dimethyl acetal, caproaldehyde dimethyl acetal, and mixtures thereof.

2. The improvement as defined in claim 1 wherein the aldehydic compound is pelargonaldehyde.

3. The improvement as defined in claim 1 wherein the aldehydic additive is a 3:1 mixture of pelargonaldehyde dimethyl acetal and caproaldehyde dimethyl acetal.

References Cited

UNITED STATES PATENTS 3,133,953   5/1964   Miwa et al. _____ 260—601 X

OTHER REFERENCES

Pryde et al., Journal of the Amer. Oil Chemist Society, vol. 38, pages 375–379, 1961.

LEON ZITZER, Primary Examiner

R. H. LILES, Assistant Examiner

U.S. Cl. X.R.

260—339